(Model.)

W. J. MORAN.
VEHICLE SPRING.

No. 280,391. Patented July 3, 1883.

Witnesses;

H. Walter Fowler
H. B. Applewhaite

Inventor;

W. J. Moran
Per Atty
A. H. Evans & Co

UNITED STATES PATENT OFFICE.

WILLIAM J. MORAN, OF FREEPORT, ILLINOIS, ASSIGNOR OF ONE-HALF TO JOHN H. SCHLOTT, OF SAME PLACE.

VEHICLE-SPRING.

SPECIFICATION forming part of Letters Patent No. 280,391, dated July 3, 1883.

Application filed March 1, 1883. (Model.)

*To all whom it may concern:*

Be it known that I, WILLIAM J. MORAN, of Freeport, in the county of Stephenson and State of Illinois, have invented certain new and useful Improvements in Vehicle-Springs; and I do hereby declare the following to be a full, clear, and exact description of the same, reference being had to the accompanying drawings, making part of this specification, in which—

Figure 1:
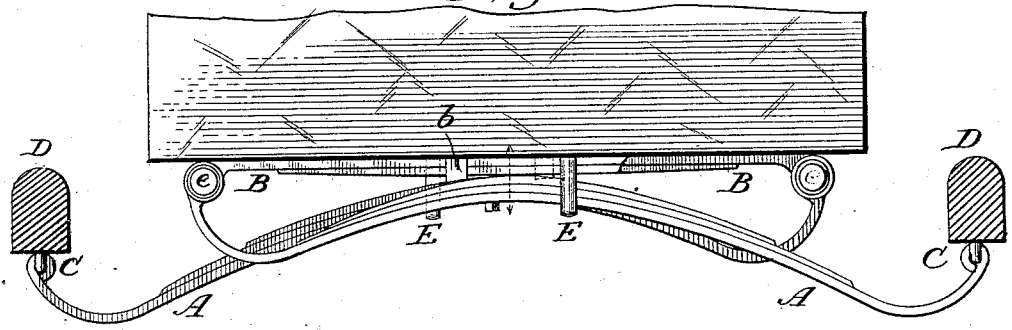
Figure 2:
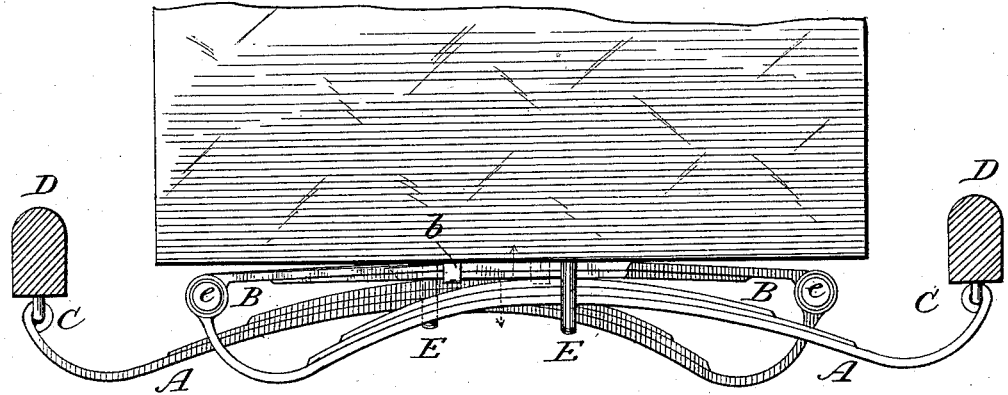

Figure 1 represents a vehicle-spring in its normal position, and with my improvements attached. Fig. 2 is the same with the pressure applied.

The object of my invention is to produce a light, durable, and elastic spring for side-bar and other vehicles, adapted to be used as a transverse spring in side-bar vehicles, and as a longitudinal or side spring on other vehicles, the spring being so constructed and arranged as to secure an elastic but equalizing motion that will prevent pitching, rocking, or side-swinging of the body of the vehicle; and my invention consists in the combination of devices hereinafter explained and claimed.

To enable others skilled in the art to make and use my invention, I will proceed to describe the exact manner in which I have carried it out.

In the drawings, A A represent the main curved springs, and B B the horizontal springs. The horizontal springs B B are bolted or otherwise secured, on their inner ends, to the body of the vehicle, and clipped at *b*, as shown in the drawings, their outer or free ends being properly attached at *e* to the reversed springs A, the shape of which is shown in the drawings as curved longitudinally, and reversely curved at the ends, one end of each spring being provided with a loop or eye, by which it is attached to the horizontal spring B at *e*, and the other end provided with a loop or eye, C, by which it is clipped to the side bar or axle-bed D. Each of the reversed springs is loosely suspended below the body of the vehicle by stirrups E, as shown in the drawings. The stirrup E is sufficiently large to allow a free movement of the spring A through it, as the spring receives its downward pressure from the load. Thus as the spring A is depressed at its center, the metal of the spring being forced downward and outward toward C, the spring would move through the stirrup E, and the metal would be received into the curve of the spring on the opposite side of the stirrup toward *e*, thus equalizing the pressure. The curved member A of each spring may be considered as a lever, the top of its longer arch resting upon the straight member, the point of bearing, in its normal or unloaded condition, being at the center of the vehicle-body, as represented by the double-headed arrow shown in Fig. 1 of the drawings. When the spring is loaded, the lever action of the curved member causes the free end of the straight member to be bent or deflected away from the bottom of the vehicle, as shown in Fig. 2. The movement of the spring causes both a rolling and a sliding or partly rolling and sliding movement of the arch upon the straight member. This sliding movement is indicated by the two arrows in Fig. 2, and it will also be seen in the same figure that the bearing or fulcrum point has changed considerably toward the side of the vehicle-body by the rolling of the arch, as above explained. These changes in the bearing point or fulcrum change the relative lengths of the two arms of the lever-spring A, as will be readily understood, in such a manner that the spring becomes stronger or stiffer as the load increases, and lighter or more flexible in proportion as the load is diminished. In a full-sized spring the shifting of the fulcrum or bearing point is from two to four inches, according to load, and the springs being applied in pairs, having their ends disposed in opposite directions, this gives, when loaded, a broad bearing-base for the vehicle-body, thus preventing it from swaying or rolling. The strength of the spring may be regulated, to a certain extent, by placing the clip or loop *b* farther from or nearer to the free end of the straight member B, thus in effect making the said member longer or shorter.

I am aware of the existence of Patent No. 218,419, which shows a spring somewhat similar to mine; but there is this distinction, however: the lower member of the said patented spring is bent to an obtuse angle where it forms a bearing upon the upper member, and it lacks the rolling and sliding bearing which is given by the arched and curved construction described by me, and which I consider an essential feature of my invention.

Having thus described my invention, what I claim as new, and desire to secure by Letters Patent, is—

The herein-described spring, composed of one straight and one curved member united at one end by a joint, said curved member having an arch and recurved end, said arch resting upon the straight member, and forming therewith a rolling and sliding bearing, as herein set forth.

WILLIAM JAMES MORAN.

Witnesses:
 A. T. GREEN,
 JOHN H. SCHLOTT.